(12) United States Patent
Feng

(10) Patent No.: US 7,227,708 B2
(45) Date of Patent: Jun. 5, 2007

(54) SYSTEM AND METHOD FOR DETERMINING LONG-RANGE ERASURE OF ADJACENT TRACKS IN HARD DISK DRIVE

(75) Inventor: Joseph Shao-Ying Feng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 164 days.

(21) Appl. No.: 10/985,139

(22) Filed: Nov. 10, 2004

(65) Prior Publication Data

US 2006/0098318 A1    May 11, 2006

(51) Int. Cl.
*G11B 27/36* (2006.01)
(52) U.S. Cl. .............. 360/31; 360/46; 360/53; 360/48; 360/77.06
(58) Field of Classification Search ........... None
See application file for complete search history.

(56) References Cited

U.S. PATENT DOCUMENTS

| | | | | |
|---|---|---|---|---|
| 4,821,125 A * | 4/1989 | Christensen et al. ......... 360/31 |
| 5,392,290 A * | 2/1995 | Brown et al. ............... 714/6 |
| 5,600,500 A * | 2/1997 | Madsen et al. ............. 360/46 |
| 5,903,408 A * | 5/1999 | Omi ..................... 360/73.03 |
| 6,791,775 B2 * | 9/2004 | Li et al. .................... 360/31 |
| 6,826,014 B2 * | 11/2004 | Lam et al. ................ 360/126 |
| 6,826,140 B2 * | 11/2004 | Brommer et al. ............ 369/94 |
| 6,947,234 B2 * | 9/2005 | Lamberts et al. ........... 360/53 |
| 7,095,576 B2 * | 8/2006 | Kim et al. ................. 360/46 |
| 7,102,838 B2 * | 9/2006 | Kim et al. ................. 360/31 |
| 7,110,197 B2 * | 9/2006 | Cho ....................... 360/31 |
| 2002/0030912 A1 * | 3/2002 | Kasajima et al. ........... 360/31 |
| 2004/0193798 A1 * | 9/2004 | Kuwamura ................ 711/114 |
| 2006/0066971 A1 * | 3/2006 | Alex et al. ................ 360/31 |

* cited by examiner

*Primary Examiner*—Andrea Wellington
*Assistant Examiner*—Dismery Mercedes
(74) *Attorney, Agent, or Firm*—John L. Rogitz

(57) ABSTRACT

A method for identifying victim tracks distanced from an aggressor track in a hard disk drive that are deleteriously affected by long range fringe effects causing adjacent track interference (ATI) when the aggressor track is written includes writing first and second frequencies to candidate victim tracks, and writing a third frequency to the aggressor track. The amplitudes of the remaining frequencies are read and output and if desired normalized as an indication of ATI to distant victim tracks. Or, data can be written and on-track error rates (OTER) used to determine ATI.

20 Claims, 6 Drawing Sheets

FINDING DISTANT VICTIM TRACKS

ANALYZING RESULTS

SYSTEM AND METHOD FOR DETERMINING LONG-RANGE ERASURE OF ADJACENT TRACKS IN HARD DISK DRIVE

I. FIELD OF THE INVENTION

The present invention relates generally to hard disk drives.

II. BACKGROUND OF THE INVENTION

In hard disk drives (HDD), deleterious effects can occur that are known as "adjacent track interference" (ATI), a phenomenon caused by inadvertent erasure of data that is underneath certain portions of the recording head during disk drive operation. There are presently no known solutions to this problem, other than to design heads such that ATI effects are minimized, or to adjust the write current and/or the disk design to minimize ATI, but due to process and material variations, a system designed to produce little or no ATI may still exhibit poor ATI performance, that is, cause inadvertent erasure of victim data tracks in the drive. Generally, ATI is not a serious issue in the short term for nominally good head designs, but repeated use of the head in the drive causes gradual performance degradation over time because data on adjacent tracks is increasingly erased as the head is used.

The present invention further recognizes that conventionally, ATI has been understood to occur to tracks ("victim tracks") that are immediately next to a track being written ("aggressor track") in hard disk drives that employ skewed heads, e.g., in drives that use rotary actuators which produce large head skews relative to the track near the outer diameter (OD) of a disk. As critically recognized herein, however, heretofore unknown ATI can occur at zero skew and to victim tracks that are relatively distanced from the aggressor track, e.g., that may be as much as two microns distant from the track being written for hears designed for track pitches of two hundred nanometers (200 nm) or less. Prior solutions to detecting ATI for corrective action thus were not directed to such distant victim tracks and, hence, were not designed to detect it, despite the fact that the present invention understands it exists. Having made this discovery, the present invention further understands that it is important to detect and characterize this previously unknown failure mode.

SUMMARY OF THE INVENTION

A method according to one aspect of the invention includes writing at least one and preferably both of a first frequency and a second frequency to plural candidate victim tracks associated with a hard disk drive. The method also includes writing a third frequency to an aggressor track that is substantially radially centered relative to the candidate victim tracks to cause adjacent track interference (ATI) in at least some of the candidate victim tracks, some of which are not immediately adjacent to the aggressor track. Signals are then outputted for representing the first and second frequencies from the candidate victim tracks after the aggressor track has been written. Based on the signals, actual victim tracks among the candidate victim tracks are identified. If desired, the method may also include normalizing the signals to victim tracks that are distanced from the aggressor track.

In another aspect, a method is disclosed for identifying victim tracks that are distanced from an aggressor track in a hard disk drive and that are deleteriously affected by long range fringe effects causing adjacent track interference (ATI) when the aggressor track is written. The method includes writing complex data to plural candidate victim tracks associated with a hard disk drive. The method also includes writing a signal to an aggressor track that is substantially radially centered relative to the candidate victim tracks to cause adjacent track interference (ATI) in at least some of the candidate victim tracks. On-track error rates (OTER) in the candidate victim tracks are determined, and ATI is indicated based on the error rates. If desired, the method may include correlating time-averaged amplitudes (TAA) to the OTER, with the TAA being used to indicate ATI.

In yet another aspect, a system for determining the efficacy of the design of a magnetic recording head includes logic that can include detecting adjacent track interference (ATI) in plural victim tracks of a hard disk that are spaced from an aggressor track by plural other tracks. The ATI is caused by fringe fields which are generated by the head when the aggressor track is written. The logic of the system also includes generating an output representative of the ATI. The output is useful for determining improvements to head design.

The details of the present invention, both as to its structure and operation can best be understood in reference to the accompanying drawings, in which like reference numerals refer to like parts, and in which:

DETAILED DESCRIPTION

Figure 1:
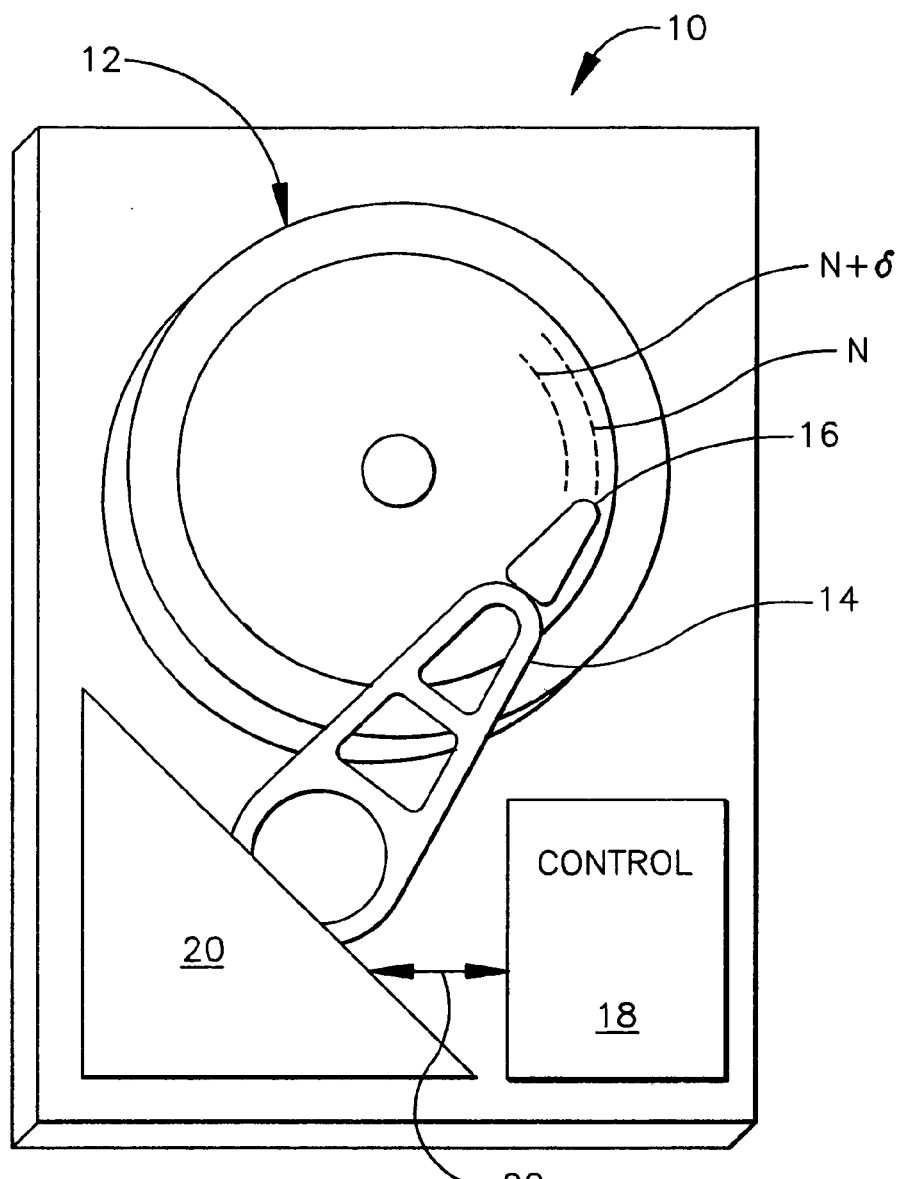
FIG. 1 is a perspective view of an exemplary embodiment of the present magnetic storage device, configured as a hard disk drive, with portions of the housing broken away.

Referring initially to FIG. 1, a magnetic data storage device is shown, generally designated 10, for storing data on a storage medium 12 that in one embodiment may be implemented by plural storage disks in a hard disk drive (HDD). When implemented as a hard disk drive, the device 10 includes an arm 14 having a read/write head 16 (part of what is colloquially referred to as a "slider") on the end thereof in accordance with hard disk drive principles. The data storage region 12 may be managed by a controller 18 that can be a conventional hard disk drive controller implemented as a chip and modified per the logic below. The controller 18 controls an electromechanical actuator 20 by sending signals over a path 22 in accordance with principles known in the art to read data from and to write data to the disks 12.

As shown in FIG. 1, when it is desired to write data to some track N, the write head (e.g., the main pole of a perpendicular recording head, it being understood that the principles advanced herein apply to both perpendicular and longitudinal recording) is positioned over the track N and the write is executed. As mentioned above, one or more tracks N+δ (where δ is a positive or negative integer) might experience stray magnetic fields when the $N^{th}$ track is written, thereby potentially causing ATI in the track or tracks N+δ. Under these circumstances, the $N^{th}$ track being written can be considered to be an "aggressor" track, and any adjacent tracks that are potentially affected by the writing of the $N^{th}$ track can be considered to be "victim tracks" associated with the aggressor track N.

Figure 2:
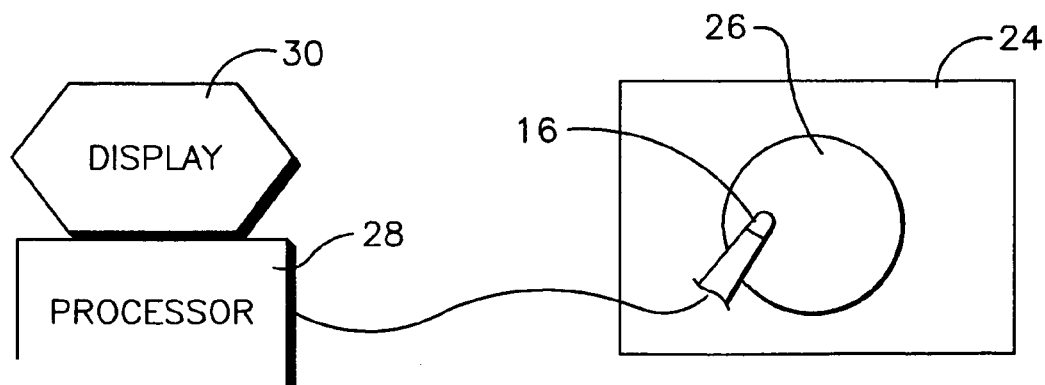
FIG. 2 is a schematic view of a test stand.

FIG. 2 shows that the head 16 can be tested in a test stand 24 in which a test disk 26 can spin. A processor 28 can be connected to the head 16 for undertaking the inventive method herein for identifying victim tracks that are distant from an aggressor track but that are nevertheless deleteriously affected by adjacent track interference (ATI) caused by long range fringe effects. The victim tracks may be as much as two microns or more distant from the aggressor track. Various displays discussed further below can be output on a display monitor 30 that is connected to the processor 28. It is to be understood that the controller 18 shown in FIG. 1 alternatively can be used to execute the present logic after the head 16 has been incorporated into the HDD 10.

Figures 3, 4:
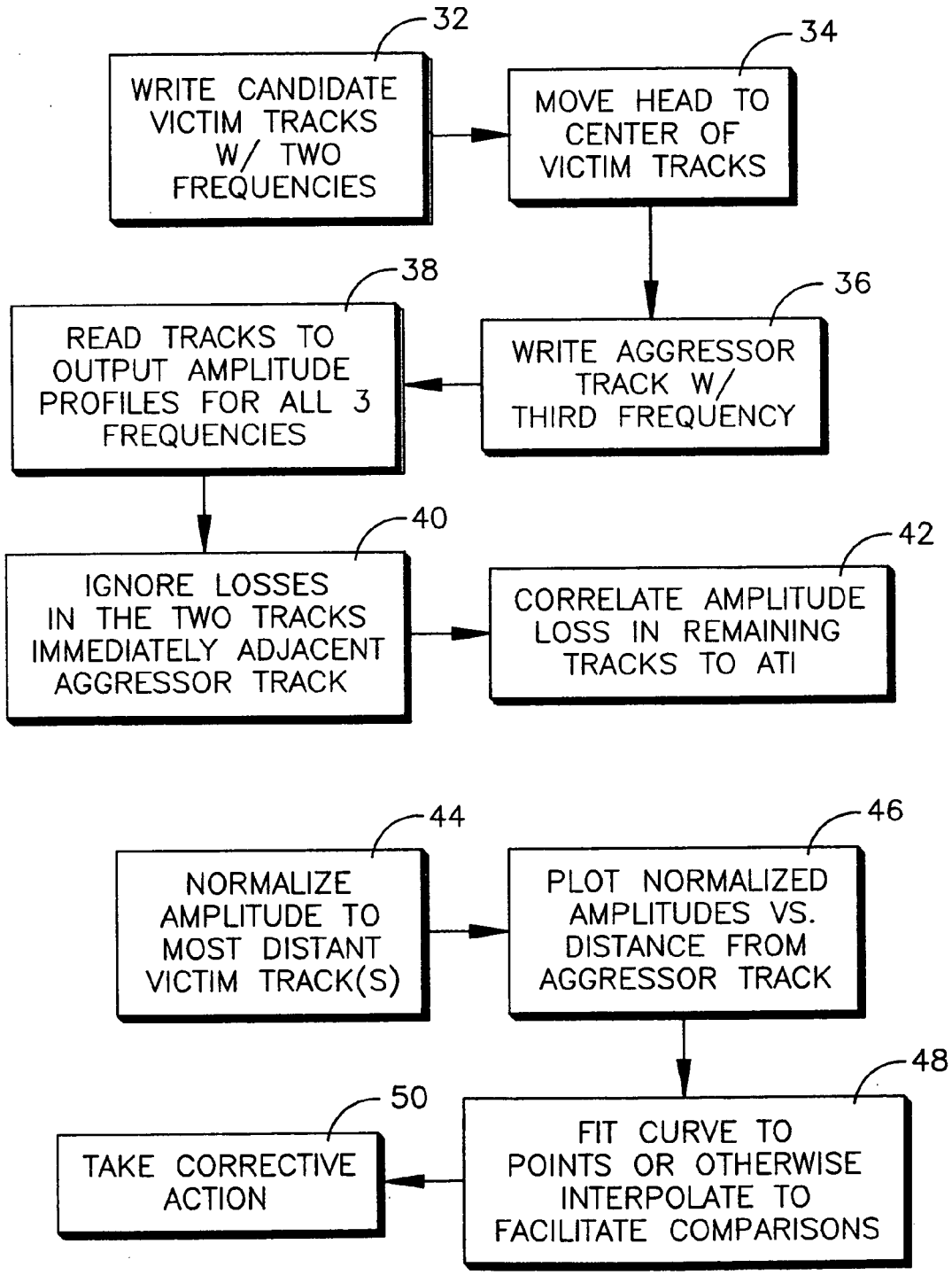
FIG. 3 is a flow chart of one implementation of the logic for identifying distant victim tracks.
FIG. 4 is a flow chart of one implementation of the data analysis logic.

FIG. 3 shows a first implementation of the present logic for identifying tracks that are victims of ATI when relatively distant aggressor tracks are written. Commencing at block 32, candidate victim tracks are written using the head 16 with at least a first frequency and preferably also with a second frequency that is close to the first. In one non-limiting implementation the first frequency is one hundred ninety five megahertz (195 MHz) and the second frequency is two hundred five megahertz (205 MHz). The track pitch preferably is wider than the write width of the head 16, and may be, e.g., two hundred fifty nanometers (250 nm).

At block 34, the head 16 is moved to the center of the candidate victim tracks and then at block 36 the center track, now an "aggressor" track, is written using a third frequency, e.g., two hundred megahertz (200 MHz). It is to be understood that not only the two tracks straddling the aggressor track, but also more distanced tracks, are candidate victim tracks that have been written using the first (and if desired second) frequencies. The aggressor track may be written plural times, e.g., ten thousand.

Proceeding to block 38, the tracks, both candidate victim and aggressor, are read to obtain the amplitude profiles for the tracks for all three frequencies. Block 40 simply indicates that the two tracks that are immediately adjacent the aggressor track may be ignored, since any degradation in those tracks may be due to effects other than fringe ATI. At block 42, the amplitude loss, if any, in each candidate victim track is correlated to an undesirable ATI in accordance with further details below.

More specifically, as indicated at block 44 in FIG. 4, the amplitudes obtained in FIG. 3 may be normalized to the most distant victim tracks, i.e., the most distant of the candidate victim tracks found to have suffered ATI. The normalized amplitudes may be plotted as a function of distance from the aggressor tracks at block 46, and a curve fitted to the plotted points at block 48 to facilitate interpolation for comparison purposes. At block 50, corrective action may be taken, including providing head designers with the ATI information so that they may improve the design of the head 16.

Figure 5:
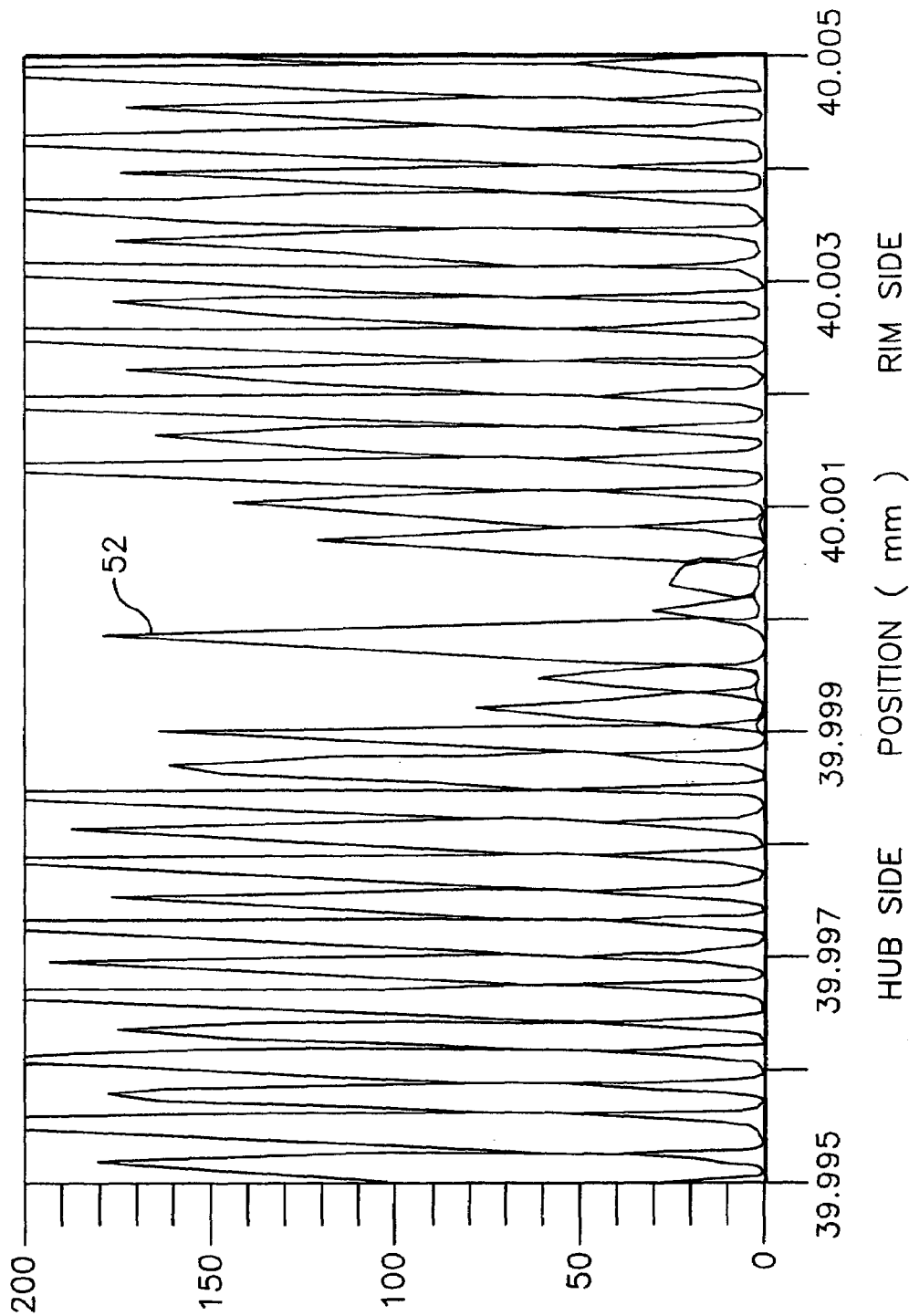
FIG. 5 is a plot of amplitudes versus distance from the aggressor track.
Figure 6:
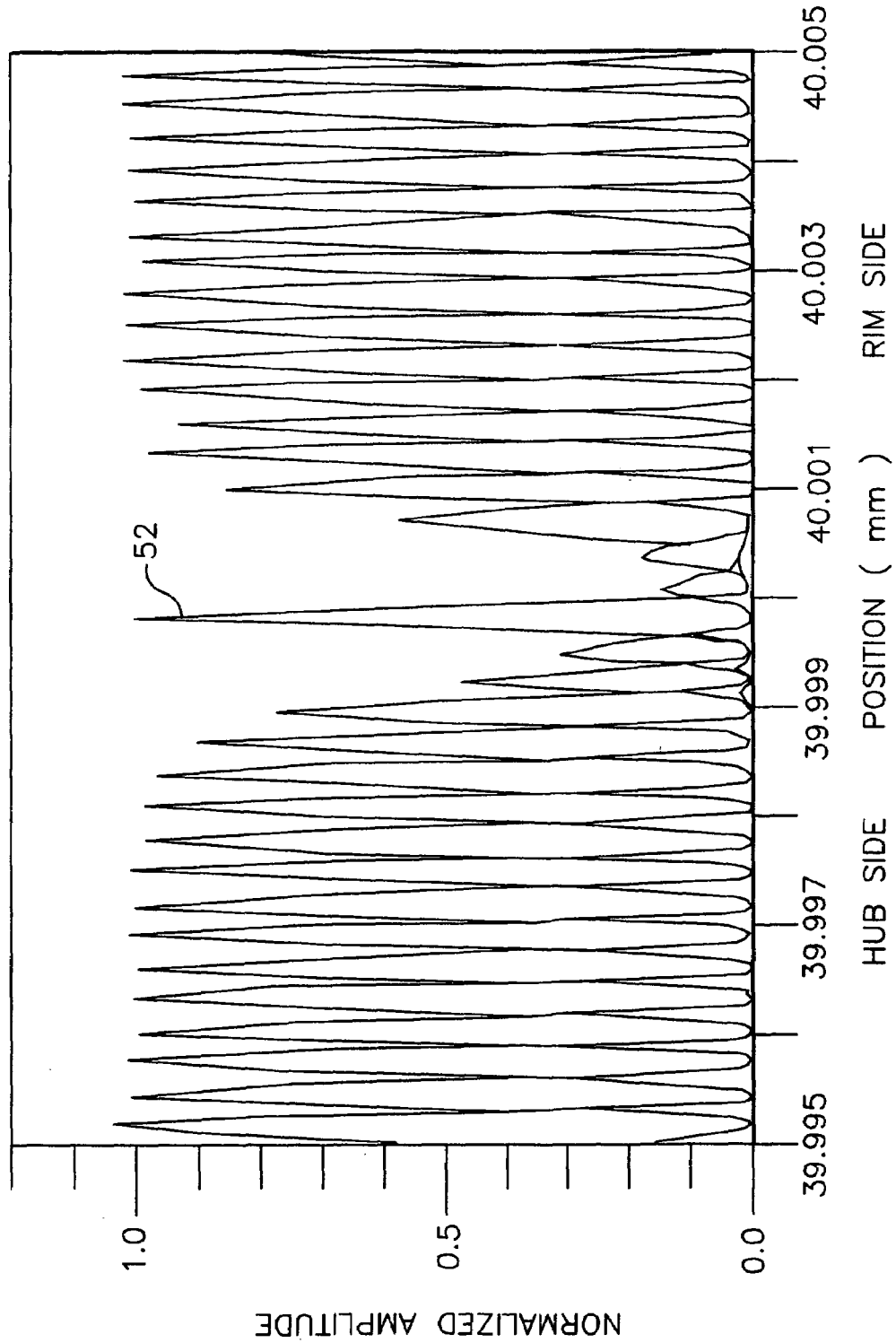
FIG. 6 is a plot of the normalized frequency amplitudes.
Figure 7:
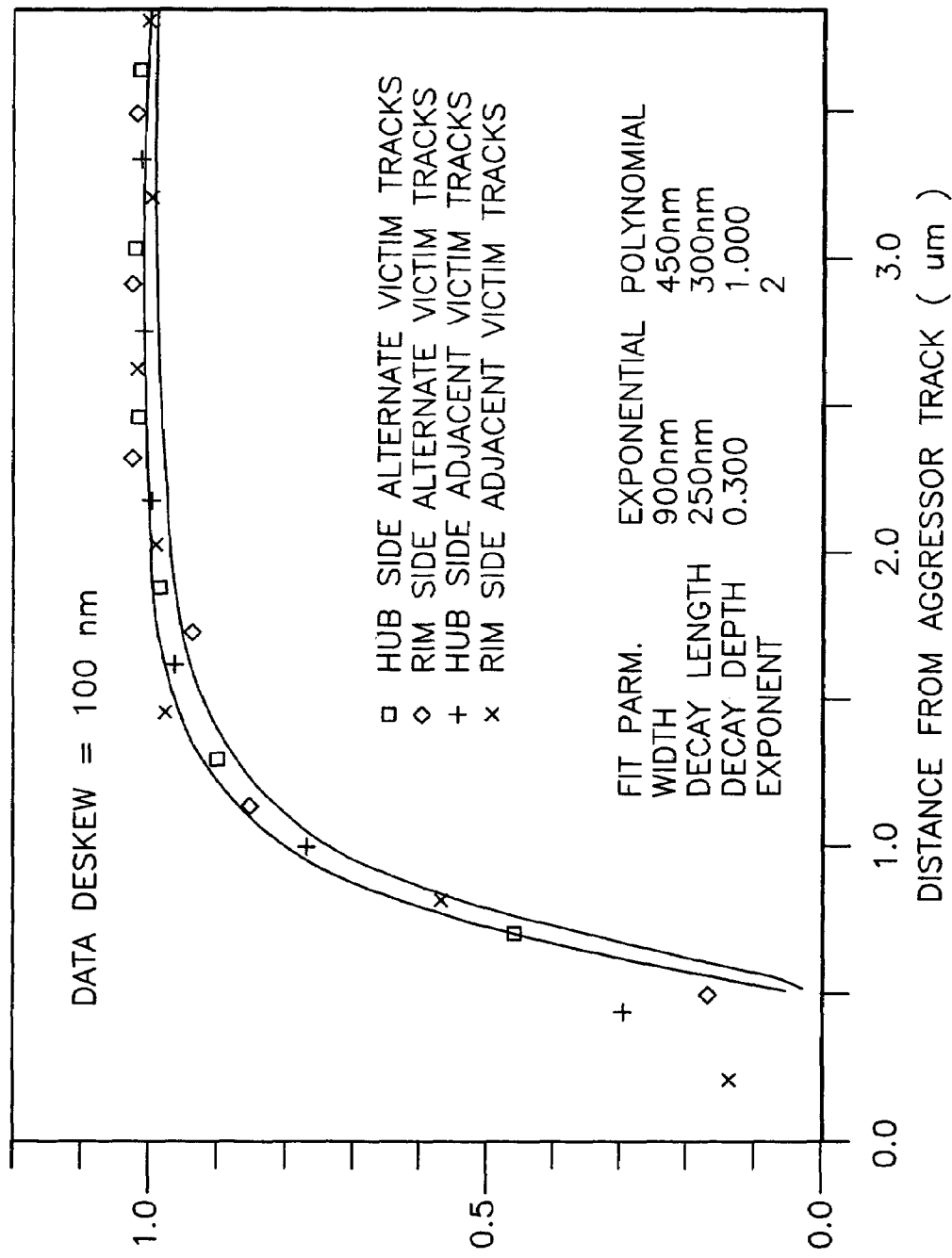
FIG. 7 is a plot of values representing normalized peak amplitudes versus distance from the aggressor track.

FIGS. 5–7 graphically illustrate several of the above steps. In FIG. 5, the center amplitude 52 represents the amplitude of the third frequency of the aggressor (center) track, and the other amplitudes represent the amplitudes of the first and second frequencies on the candidate victim tracks, with tracks to the left of the amplitude 52 being on the hub side of the aggressor track and tracks to the right being on the rim side. The positions of the tracks are shown on the x-axis, and zero skew was used in the example shown in FIG. 5, it being understood that non-zero skew may also be used during the test. FIG. 6 shows the same amplitudes shown in FIG. 5 but normalized to the most distant victim tracks, while FIG. 7 shows a plot of the amplitudes versus distance from the aggressor track with a curve fitted through the points. "Adjacent" victim tracks refers to the tracks closest to the aggressor track, then the third closest, fifth closest, and so on, while "alternate" victim tracks refers to victim tracks between the adjacent victim tracks. Note from FIG. 7 that the present invention is able to determine that some minimal amount of deleterious ATI may be present as far as two microns from the aggressor track.

Figure 8:
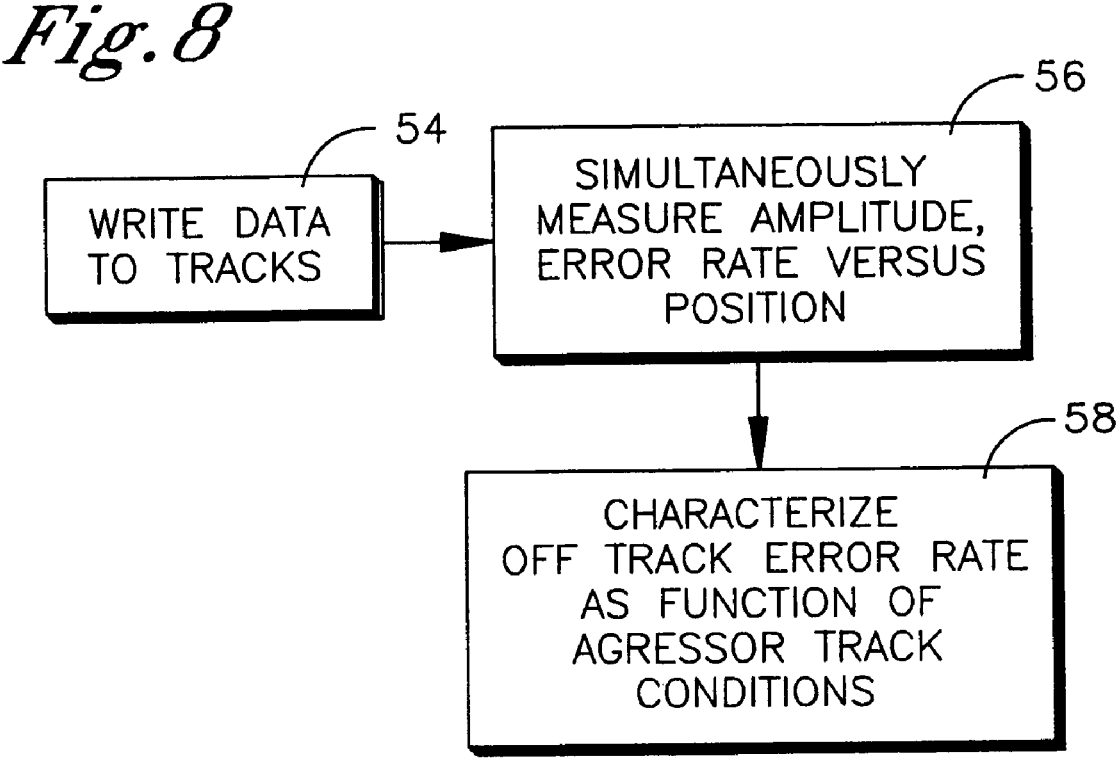
FIG. 8 is a flow chart of a second implementation of the logic for identifying distant victim tracks.

FIG. 8 shows an alternate method for finding distant victim tracks which begins at block 54 by writing complex data, instead of frequencies, to candidate victim tracks and to an aggressor track. Simultaneously, at block 56 the track-averaged signal amplitude (TAA) from the tracks and the error rate detected for each track may be measured as a function of position or distance from the aggressor track. Moving to block 58, the off-aggressor track error rate may be correlated to or characterized as a function of aggressor track conditions, including distance from the aggressor track. If TAA is correlated to the off-track error rate, the off-track error rate degradation can be estimated from the amplitude measurements, it being understood that such a "shortcut" should be cautiously used because erasure rates may not be exactly the same for the TAA of a complex pattern as it would for a constant frequency pattern.

While the particular SYSTEM AND METHOD FOR DETERMINING LONG-RANGE ERASURE OF ADJACENT TRACKS IN HARD DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method comprising:
writing at least one of: a first frequency, and second frequency, to plural candidate victim tracks associated with a hard disk drive;
writing at least a third frequency to an aggressor track substantially radially centered relative to the candidate victim tracks to cause adjacent track interference (ATI) in at least some of the candidate victim tracks, at least some candidate victim tracks not being immediately adjacent the aggressor track;
outputting signals representing at least the first or second frequency from the candidate victim tracks, after the aggressor track has been written; and
based on the signals, identifying victim tracks among the candidate victim tracks.

2. The method of claim 1, comprising writing both first and second frequencies to the candidate victim tracks.

3. The method of claim 2, wherein the first frequency is substantially close to the second frequency.

4. The method of claim 2, wherein the first frequency is substantially equal to one hundred ninety five megahertz and the second frequency is substantially equal to two hundred five megahertz.

5. The method of claim 4, wherein the third frequency is substantially equal to two hundred megahertz.

6. The method of claim 1, wherein the method is executed at least in pan using a test stand.

7. The method of claim 1, wherein the method is executed at least in part using a controller of a hard disk drive.

8. The method of claim 1, comprising normalizing the signals to at least one victim track distanced from the aggressor track.

9. A method for identifying victim tracks distanced from an aggressor track in a hard disk drive that are deleteriously affected by long range fringe effects causing adjacent track interference (ATI) when the aggressor track is written, the victim tracks not being immediately adjacent the aggressor track, comprising:
writing data to plural candidate victim tracks associated with a hard disk drive;
writing a signal to an aggressor track substantially radially centered relative to the candidate victim tracks to cause adjacent track interference (ATI) in at least some of the candidate victim tracks, at least some candidate victim tracks not being immediately adjacent the aggressor track;
determining on-track error rates (OTER) in the candidate victim tracks; and
indicating ATI based ar least in part on the error rates.

10. The system of claim 9, comprising correlating at least one time-averaged amplitude (TAA) to the OTER, the TAA being used to indicate ATI.

11. The system of claim 10, wherein at least some of the acts are executed in a test stand.

12. The system of claim 10, wherein the determining act is executed in a controller of a hard disk drive.

13. A system for determining the efficacy of the design of a magnetic recording head, comprising logic executing method acts comprising:
detecting adjacent track interference (ATI) in plural victim tracks of a hard disk that are spaced from an aggressor track by plural other tracks, the ATI being caused by fringe fields generated by the head when the aggressor track is written to;
generating an output representative of the ATI; and
using the output to determine a design of a head, wherein the logic far detecting includes;
writing at least one of: a first frequency, or second frequency, to plural candidate victim tracks associated with the hard disk;
writing at least a third frequency to an aggressor track substantially radially centered relative to the candidate victim tracks to cause adjacent track interference (ATI) in at least some of the candidate victim tracks, at least some candidate victim tracks not being immediately adjacent the aggressor track; and
outputting signals representing at least the first or second frequency from the candidate victim tracks, after the aggressor track has been written.

14. The system of claim 13, wherein the method acts comprise writing both first and second frequencies to the candidate victim tracks.

15. The system of claim 14, wherein the first frequency is substantially close to the second frequency.

16. The system of claim 14, wherein the first frequency is substantially equal to one hundred ninety five megahertz and the second frequency is substantially equal to two hundred five megahertz.

17. The system of claim 16, wherein the third frequency is substantially equal to two hundred megahertz.

18. The system of claim 13, comprising a test stand.

19. The system of claim 13, comprising a controller of a hard disk drive.

20. A system for determining the efficacy of the design of a magnetic recording head, comprising logic executing method acts comprising:
detecting adjacent track interference (ATI) in plural victim tracks of a hard disk that are spaced from an aggressor track by plural other tracks, the ATI being caused by fringe fields generated by the head when the aggressor track is written to;
generating an output representative of the ATI; and
using the output to determine a design of a head, wherein the logic for detecting includes;
writing data to plural candidate victim tracks associated with the hard disk;
writing a signal to an aggressor track substantially radially centered relative to the candidate victim tracks to cause adjacent track interference (ATI) in at least some of the candidate victim tracks, at lead some candidate victim tracks not being immediately adjacent the aggressor track; and
determining on-track error rates (OTER) in the candidate victim tracks.

* * * * *